(12) United States Patent
Lin et al.

(10) Patent No.: US 8,254,106 B2
(45) Date of Patent: Aug. 28, 2012

(54) MOUNTING APPARATUS FOR DATA STORAGE DEVICE

(75) Inventors: Chieh-Hsiang Lin, Taipei Hsien (TW);
Chien-Chih Tung, Taipei Hsien (TW);
Wen-Chen Wang, Taipei Hsien (TW);
Chung-Ping Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 344 days.

(21) Appl. No.: 12/612,689

(22) Filed: Nov. 5, 2009

(65) Prior Publication Data
US 2011/0085291 A1 Apr. 14, 2011

(30) Foreign Application Priority Data
Oct. 12, 2009 (CN) .......................... 2009 1 0308185

(51) Int. Cl.
*H05K 7/12* (2006.01)
(52) U.S. Cl. ................. 361/679.33; 361/727; 312/223.1
(58) Field of Classification Search .......... 361/679.33–679.39, 679.01, 679.02, 361/724–727; 312/223.1–223.2; 248/200
See application file for complete search history.

(56) References Cited

U.S. PATENT DOCUMENTS

| | | | | |
|---|---|---|---|---|
| 7,492,586 B2 * | 2/2009 | Peng et al. | ............... | 361/679.33 |
| 7,684,181 B2 * | 3/2010 | Peng et al. | ............... | 361/679.33 |
| 7,684,182 B2 * | 3/2010 | Zhang et al. | ............. | 361/679.33 |
| 7,729,110 B2 * | 6/2010 | Zhang et al. | ............. | 361/679.33 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A mounting apparatus includes a latching member, a fastening tab, a fixing member, and a securing member. The fixing member includes a fixing plate, and a resisting plate extending from a first end of the fixing plate. The securing member includes a fixing board, and opposite clamping boards perpendicularly extending from a top and a bottom sides of a first end of the fixing board. A fixing tab extends from a second? end of the fixing board. A second end of the fixing plate is movably mounted to the clamping boards. The fastening tab is fixed to a distal end of the resisting plate, and operably clamped with the fixing tab. The latching member is rotatably mounted to the second end of the fixing plate, away from the resisting plate, and rotated to engage with or disengage from the clamping boards.

18 Claims, 5 Drawing Sheets

MOUNTING APPARATUS FOR DATA STORAGE DEVICE

BACKGROUND

1. Technical Field

The disclosure relates to mounting apparatuses for data storage devices, and particularly to a mounting apparatus that readily secures or removes a data storage device to or from a computer enclosure.

2. Description of Related Art

Generally speaking, a bracket is often used for attach a data storage device in a computer enclosure with screws. The process of attaching can be tedious and time-consuming. Moreover, in this process, one or more screws can easily fall into the crowded interior of the computer enclosure, thus requiring a difficult retrieval.

DETAILED DESCRIPTION

Figure 1:
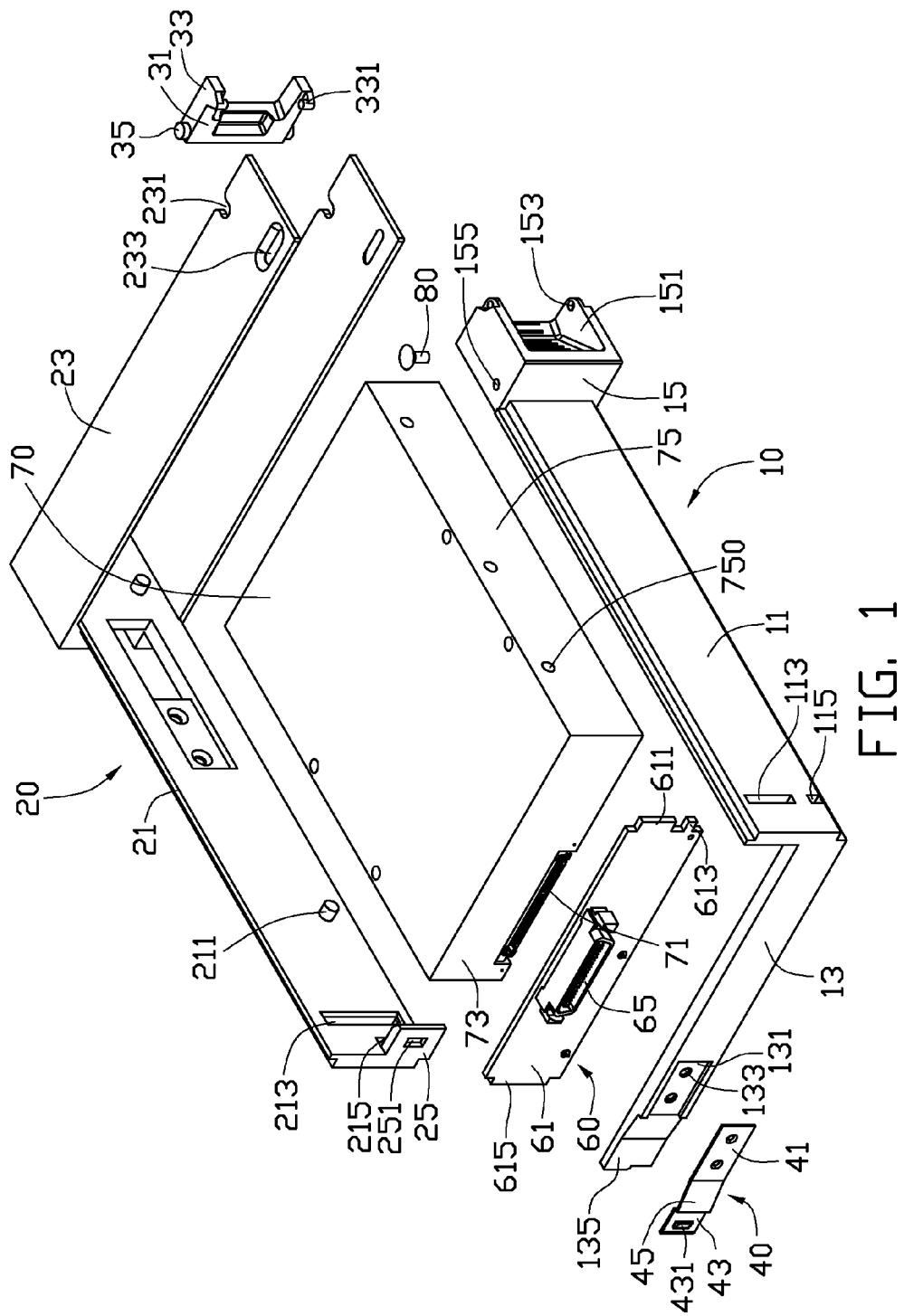
FIG. 1 is an exploded, isometric view of an exemplary embodiment of a mounting apparatus with a data storage device.
Figure 2:
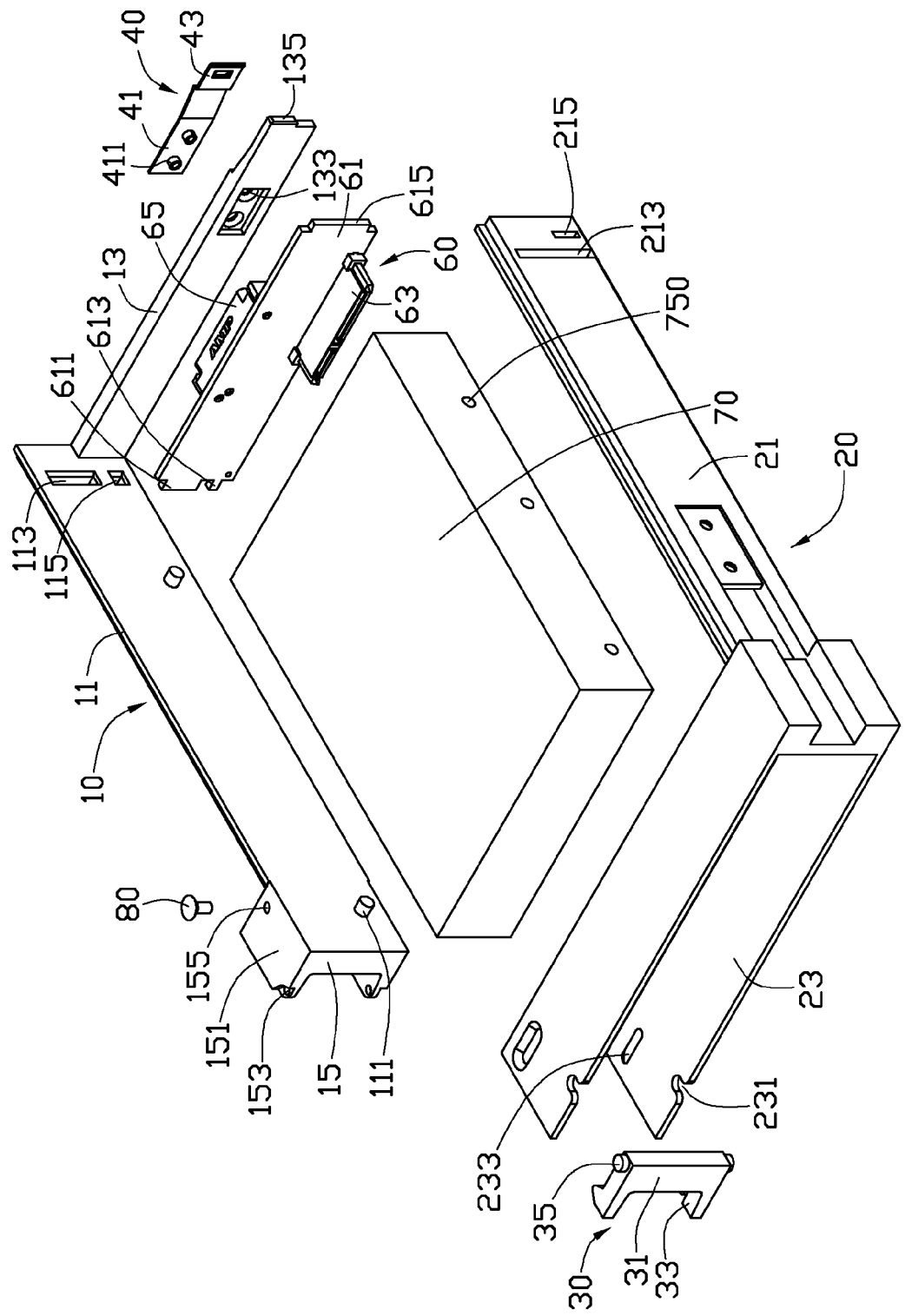
FIG. 2 is similar to FIG. 1, but viewed from another perspective.

Referring to FIGS. 1 and 2, an exemplary embodiment of a mounting apparatus is provided to fix a data storage device 70. The mounting apparatus includes a fixing member 10, a securing member 20 movably mounted to the fixing member 10, a latching member 30, a flexible fastening tab 40, a switching card 60 and two fasteners 80.

The data storage device 70 includes opposite sidewalls 75 each defining a plurality of fixing holes 750, and a rear side 73 connected to ends of the sidewalls 75. The rear side 73 defines an interface 71.

The fixing member 10 is generally L-shaped. The fixing member 10 includes a fixing plate 11 and a resisting plate 13 perpendicularly extending from a first end of the fixing plate 11. A height of the fixing plate 11 is greater than that of the resisting plate 13. A plurality of fixing posts 111 extend from an inner side of the fixing plate 11, corresponding to the fixing holes 750 of the data storage device 70. A first fastening slot 113 and a second fastening slot 115 vertically aligned with each other are defined in the fixing plate 11, neighboring the resisting plate 13. A connecting portion 15 extends from a second end of an outer side of the fixing plate 11, away from the resisting plate 13. The connecting portion 15 includes opposite connecting pieces 151 each defining a fastening hole 155 and a pivoting hole 153. A receiving ditch 131 defining two fixing holes 133, is defined in an outer side of the resisting plate 13, adjacent to a distal end of the resisting plate 13. A clamping block 135 extends from the distal end of the resisting plate 13.

The securing member 20 is generally L-shaped. The securing member 20 includes a fixing board 21, and opposite clamping boards 23 perpendicularly extending from a top and a bottom sides of a first end of the fixing board 21. The fixing board 21 defines a matching slot 213 and a through slot 215, both situated adjacent to a second end of the fixing board 21, away from the clamping boards 23. A plurality of fixing posts 211 extend from an inner side of the fixing board 21, corresponding to the fixing holes 750 of the data storage device 70. A fixing tab 25 perpendicularly extends from the inner side of the second end of the fixing board 21. The fixing tab 25 defines a locking slot 251. Each clamping board 23 defines an adjusting hole 233 being double-D shaped an aligning with each other, away from the fixing board 21, and a cutout 231 neighboring the adjusting hole 233.

The latching member 30 includes a main body 31. Opposite fixing portions 33 extend from opposite ends of the main body 31, and two pivoting shafts 331 extend towards each other from the fixing portions 33, respectively. Two fixing shafts 35 extend from opposite sides of the main body 31, respectively, and parallel to the pivoting shafts 331.

The fastening tab 40 includes a fixing portion 41, a latching portion 43 opposite to the fixing portion 41, and an operating portion 45 between the fixing portion 41 and the latching portion 43. Two fixing protrusions 411 protrude from the fixing portion 41, corresponding to the fixing holes 133 of the fixing member 10. A clamping block 431 protrudes from the latching portion 43, opposite to the fixing protrusions 411.

The switching card 60 includes a connecting board 61, and a first connector 63 and a second connector 65 fixed to opposite sides of the connecting board 61. A first fixing block 611, and a second fixing block 613 extend from a first end of the connecting board 61. A fixing flange 615 extends from a second end of the connecting board 61, opposite to the first end of the connecting board 61.

Figure 3:
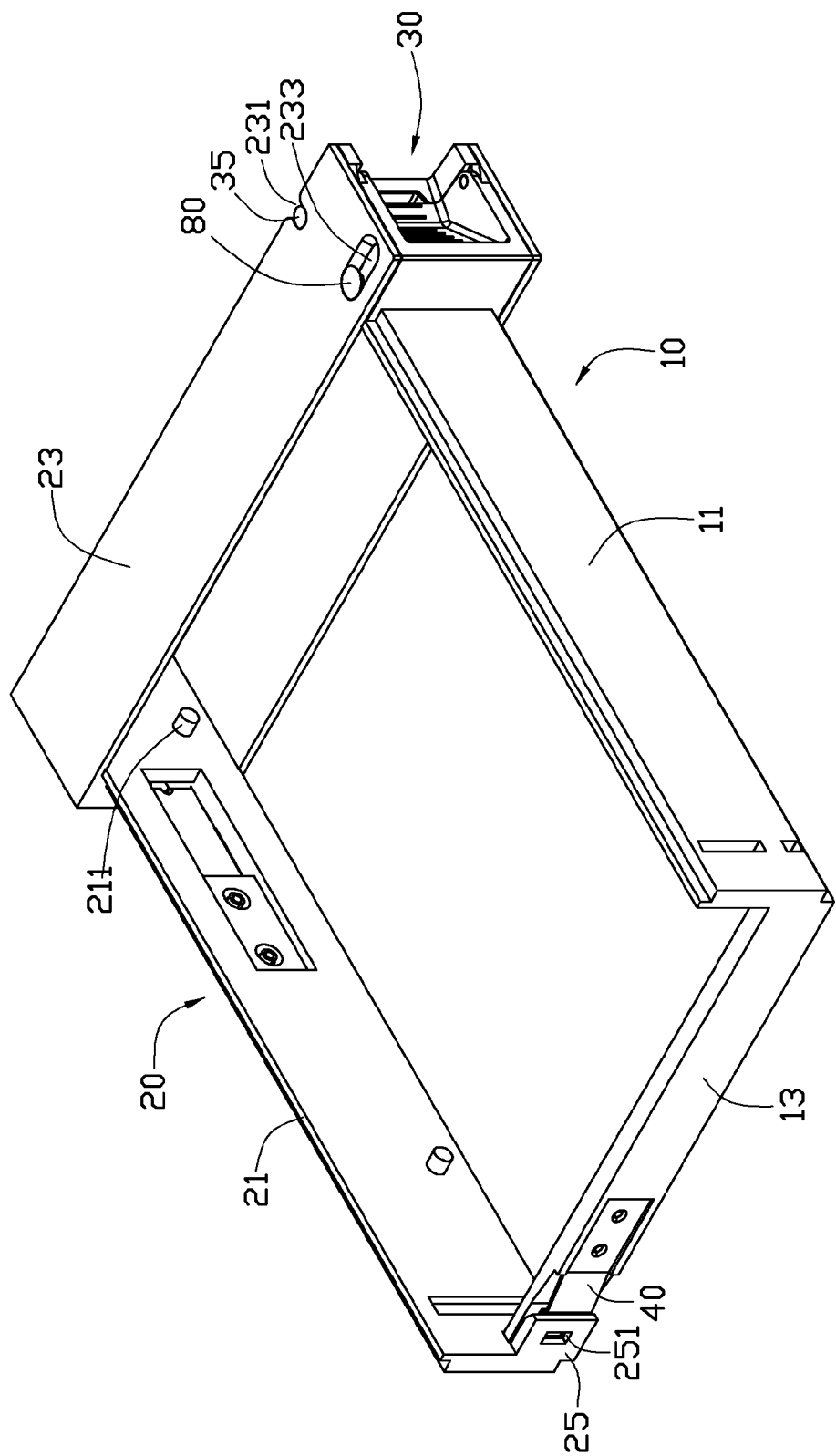
FIG. 3 is an assembled, isometric view of the mounting apparatus of FIG. 1, without showing the data storage device.

Referring to FIG. 3, to assemble the mounting apparatus, the connecting portion 15 of the fixing member 10 is sandwiched between the clamping boards 23 of the securing member 20, with the fastening holes 155 of the connecting portion 15 aligning with the adjusting holes 233 of the clamping boards 23. Two fasteners 80 are passed through the adjusting holes 233, and then screwed into the fastening holes 155. Therefore, the fixing member 10 is slidably mounted to the securing member 20, along the adjusting holes 233. The fixing protrusions 411 of the fastening tab 40 are fixed to the fixing holes 133 of the fixing member 10, therefore, the fastening tab 40 is fixed to and moved with the fixing member 10. The clamping block 135 of the resisting plate 13 of the fixing member 10 is adjusted to engage in the through slot 215 of the securing member 20. Therefore, the fastening tab 40 is sandwiched between the fixing tab 25 of the securing member 20 and the resisting plate 13, with the clamping block 431 of the fastening tab 40 clamping in the locking slot 251 of the securing member 20. The pivoting shafts 331 of the latching member 30 are rotatably engaged in the pivoting hole 153, and then the fixing shafts 35 of the latching member 30 are rotated to clamp in the cutouts 231 of the securing member 20.

Figure 4:
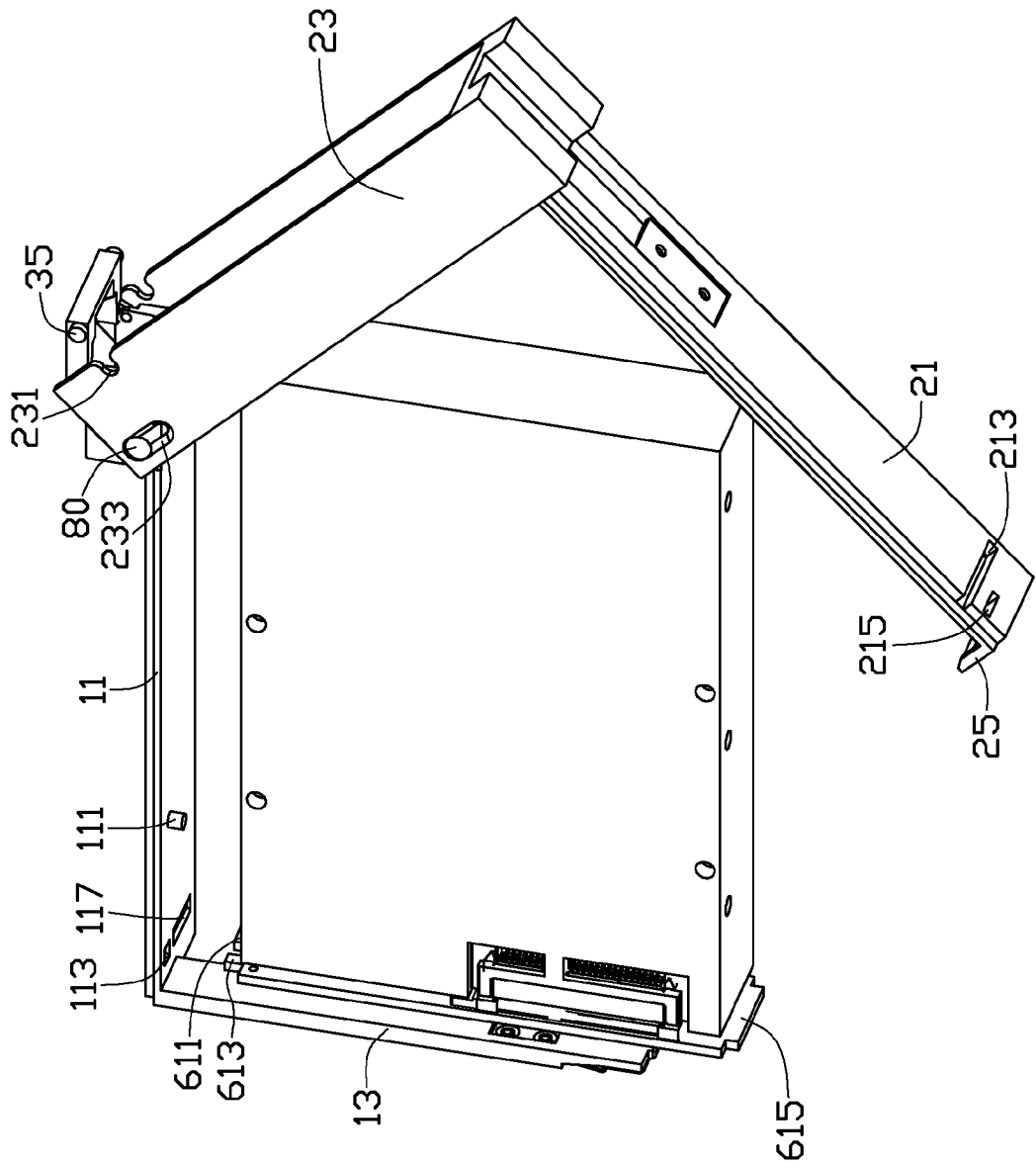
FIG. 4 is a partially assembled, isometric view of FIG. 1.
Figure 5:
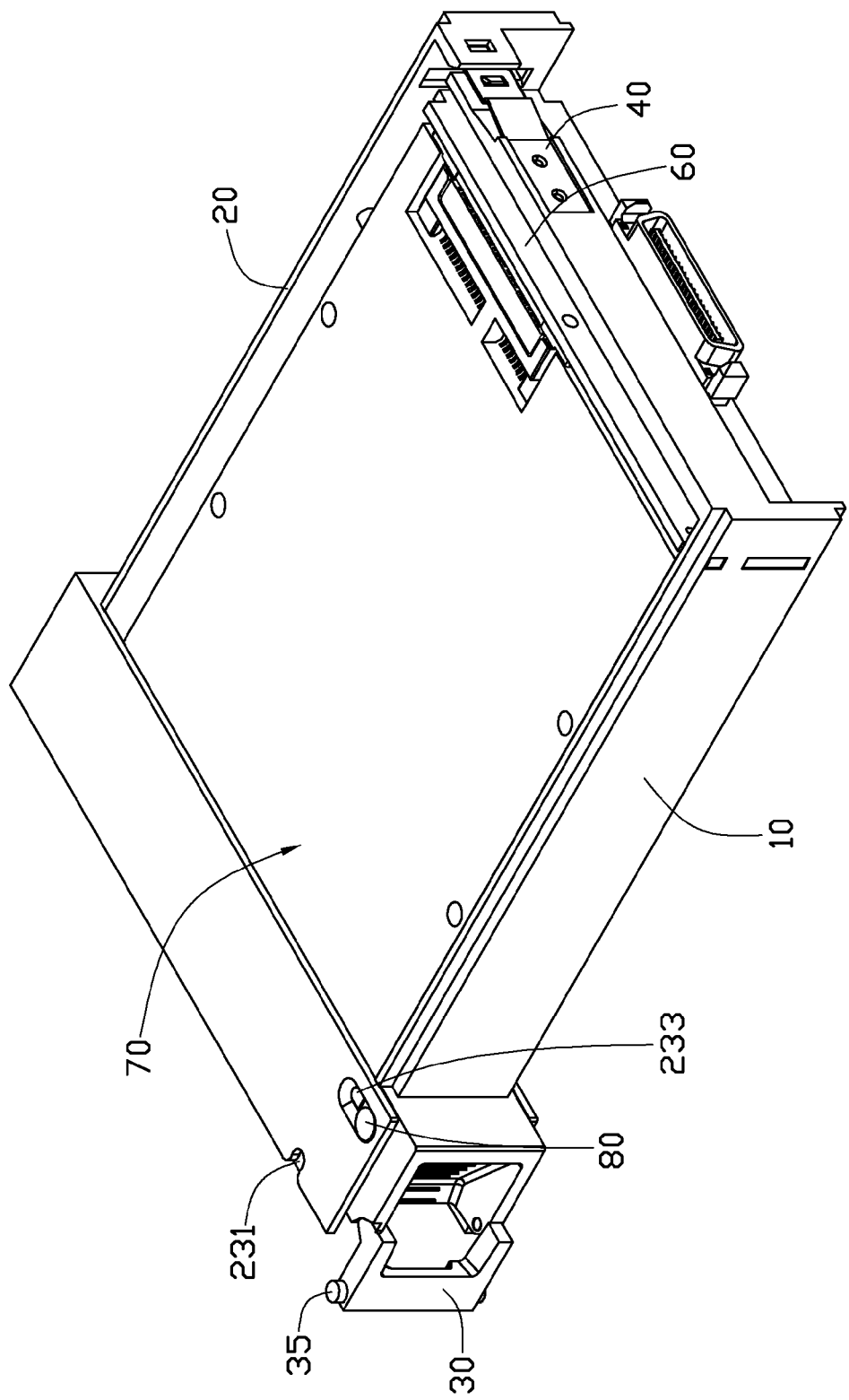
FIG. 5 is a partially assembled, isometric view of FIG. 1, but viewed from another perspective.

Referring to FIGS. 4 and 5, to assemble the data storage device 70, the switching card 60 is fixed to the rear side 73 of the data storage device 70, and the first connector 63 of the switching card 60 is connected to the interface 71 of the data storage device 70. The fixing shafts 35 of the latching member 30 are rotated to disengage from the cutouts 231 of the securing member 20. The operating portion 45 of the fastening tab 40 is depressed to deform the fastening tab 40, and then, the clamping block 431 is disengaged from the locking slot 251 of the securing member 20. Meanwhile, the fixing member 10 is drawn away from the securing member 20, with the fasteners 80 sliding in the corresponding adjacent holes 233. As a result, the clamping block 135 of the fixing member 10 is disengaged from the through slot 215 of the securing member 20. Thereafter, the first and second fixing blocks 611, 613 of the switching card 60 are engaged in the first and second fastening slots 113, 117 of the fixing member 10, and the fixing posts 111 of the fixing member 10 are engaged in the fixing holes 750 of one sidewall 75 of the data storage device 70, thereby, the switching card 60 faces and abuts the resisting plate 13 of the fixing member 10. The securing member 20 is pushed toward the fixing member 10, until the clamping block 431 of the fastening tab 40 is clamped in the locking slot 251 of the securing member 20. At this moment, the fixing posts 211 of the securing member 20 are engaged in the fixing holes 750 of the other sidewall 75 of the data storage device 70. The fixing flange 615 of the switching card 60 is engaged in the matching slot 213 of the securing member 20. Subsequently, the fixing shafts 35 are rotated to clamp in the cutouts 231.

To detach the data storage device 70 from the mounting apparatus, the fixing shafts 35 of the latching member 30 are rotated to disengage from the cutouts 231 of the securing member 20. The operating portion 45 of the fastening tab 40 is depressed to deform the fastening tab 40, and then, the clamping block 431 is disengaged from the locking slot 251 of the securing member 20. Meanwhile, the fixing member 10 is drawn away from the securing member 20, with the fasteners 80 sliding in the corresponding adjacent holes 233. Therefore, the first and second fixing blocks 611, 613 of the switching card 60 are disengaged from the first and second fastening slots 113, 117 of the fixing member 10, and the fixing posts 111 of the fixing member 10 are disengaged from the corresponding fixing holes 750 of the data storage device 70. The data storage device 70 is thus readily removed from the mounting apparatus, together with the switching card 60.

In other embodiment, the switching card 60 can be omitted. Therefore, the fixing member 10 can omit the first and second fastening slots 113, 115, and the securing member 20 can omit the matching slot 213.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the mounting apparatus comprising:
   a latching member;
   a fastening tab;
   a fixing member comprising a fixing plate, a resisting plate perpendicularly extending from a first end of the fixing plate, and a connecting portion located at a second end of the fixing plate, the connecting portion comprising two opposite connecting pieces each defining a fastening hole; and
   a securing member comprising a fixing board, and opposite clamping boards perpendicularly extending from a top and a bottom sides of a first end of the fixing board, a fixing tab perpendicularly extending from a second end of the fixing board, each clamping board defining an adjusting hole;
   wherein the second end of the fixing plate is movably mounted to the clamping boards;
   the fastening tab is fixed to a distal end of the resisting plate, and operably clamped with the fixing tab; the latching member is rotatably mounted to the second end of the fixing plate, and rotatable to engage with or disengage from the clamping boards, two fasteners are passed through the adjusting holes, and then screwed into the fastening holes, respectively.

2. The mounting apparatus of claim 1, wherein the adjusting holes have double-D shaped, the fasteners are moveable in the corresponding adjusting holes.

3. The mounting apparatus of claim 1, wherein each connecting piece further defines a pivoting hole, the latching member comprises two pivoting shafts pivotably engaged in the pivoting holes, respectively.

4. The mounting apparatus of claim 1, wherein each clamping board further defines a cutout neighboring the corresponding adjusting hole, the latching member comprises opposite fixing shafts, each fixing shaft is rotated to engage in or disengage from the corresponding cutout.

5. The mounting apparatus of claim 1, wherein a through slot is defined in the fixing board of the securing member, a clamping block extends from a distal end of the resisting plate, to engage in the through slot.

6. The mounting apparatus of claim 1, wherein the resisting plate defines two fixing holes, the fastening tab comprises a fixing portion, two fixing protrusions protrude from the fixing portion and engage in the fixing holes, respectively.

7. The mounting apparatus of claim 6, wherein the fixing tab of the securing member defines a locking slot, the fastening tab further comprises a latching portion opposite to the fixing portion, a clamping block protrudes from the latching portion, opposite to the fixing protrusions, the clamping block is clamped in the locking slot.

8. The mounting apparatus of claim 7, wherein the fastening tab further comprises an operating portion between the fixing portion and the latching portion, the operating portion is operable to force the clamping block to disengage from the locking slot.

9. The mounting apparatus of claim 1, further comprising a switching card fixed to a rear side of the data storage device, wherein the switching card comprises a connecting board, a first fastening slot and a second fastening slot are defined in the fixing plate of the fixing member, a matching slot is defined in the fixing board of the securing member; a first fixing block and a second fixing block both extend from a first end of the connecting board to engage in the first and second fastening slots, respectively; a fixing flange extends from a second end of the connecting board, opposite to the first end of the connecting board, to engage in the matching slot.

10. A mounting apparatus for a data storage device, the mounting apparatus comprising:
    a latching member;
    a fastening tab;
    a fixing member comprising a fixing plate, and a resisting plate perpendicularly extending from the fixing plate; a connecting portion extending from the fixing plate, away from the resisting plate, wherein the latching member is rotatably mounted to the connecting portion, the fastening tab is fixed to the resisting plate; and
    a securing member comprising a fixing board, and opposite clamping boards perpendicularly extending from a top and a bottom sides of the fixing board, respectively, a fixing tab extending from the fixing board; each clamping board defining an adjusting hole, the connecting portion movably mounted to the clamping boards;
    wherein when the fixing member is moved towards the securing member, the connecting portion is moved along the adjusting holes, and the fastening tab is moved to clamped with the fixing tab, thereafter, the latching member is rotatable to engage with the fixing board.

11. The mounting apparatus of claim 10, wherein the connecting portion comprises opposite connecting pieces each defining a fastening hole, the connecting pieces are sandwiched between the clamping boards, two fasteners are passed through the adjusting holes, and then screwed into the fastening holes, respectively.

12. The mounting apparatus of claim 11, wherein each connecting piece further defines a pivoting hole, the latching member comprises two pivoting shafts pivotably engaged in the pivoting holes, respectively.

13. The mounting apparatus of claim 11, wherein each clamping board further defines a cutout neighboring the corresponding adjusting hole, the latching member comprises opposite fixing shafts, each fixing shaft is rotated to engaged in or disengaged from the corresponding cutout.

14. The mounting apparatus of claim 10, wherein a through slot is defined in the fixing board of the securing member, a clamping block extends from a distal end of the of the resisting plate, to engaged in the through slot.

15. The mounting apparatus of claim 10, wherein the resisting plate defines two fixing holes, the fastening tab comprises a fixing portion, two fixing protrusions protrude from the fixing portion engage in the fixing holes, respectively.

16. The mounting apparatus of claim 15, wherein the fixing tab of the securing member defines a locking slot, the fastening tab further comprises a latching portion opposite to the fixing portion, a clamping block protrudes from the latching portion, opposite to the fixing protrusions, the clamping block is clamped in the locking slot.

17. The mounting apparatus of claim 16, wherein the fastening tab further comprises an operating portion between the fixing portion and the latching portion, the operating portion is operable to force the clamping block to disengage from the locking slot.

18. A mounting apparatus for a data storage device, the mounting apparatus comprising:
- a latching member;
- a fastening tab;
- a fixing member comprising a fixing plate and a resisting plate perpendicularly extending from a first end of the fixing plate, wherein a first fastening slot and a second fastening slot are defined in the fixing plate of the fixing member;
- a securing member comprising a fixing board, and opposite clamping boards perpendicularly extending from a top and a bottom sides of a first end of the fixing board, a fixing tab perpendicularly extending from a second end of the fixing board, wherein a matching slot is defined in the fixing board of the securing member; and
- a switching card fixed to a rear side of the data storage device, wherein the switching card comprises a connecting board, a first fixing block and a second fixing block both extend from a first end of the connecting board to engage in the first and second fastening slots, respectively; a fixing flange extends from a second end of the connecting board, opposite to the first end of the connecting board, to engage in the matching slot;
- wherein a second end of the fixing plate is movably mounted to the clamping boards; the fastening tab is fixed to a distal end of the resisting plate, and operably clamped with the fixing tab; the latching member is rotatably mounted to the second end of the fixing plate, and rotatable to engage with or disengage from the clamping boards.

* * * * *